(12) United States Patent
Wakao

(10) Patent No.: US 10,352,254 B2
(45) Date of Patent: Jul. 16, 2019

(54) INTERNAL COMBUSTION ENGINE CONTROL DEVICE

(71) Applicant: TOYOTA JIDOSHA KABUSHIKI KAISHA, Toyota-shi, Aichi-ken (JP)

(72) Inventor: Kazuhiro Wakao, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 271 days.

(21) Appl. No.: 14/893,588

(22) PCT Filed: May 28, 2014

(86) PCT No.: PCT/IB2014/000879
§ 371 (c)(1),
(2) Date: Nov. 24, 2015

(87) PCT Pub. No.: WO2014/191815
PCT Pub. Date: Dec. 4, 2014

(65) Prior Publication Data
US 2016/0123245 A1 May 5, 2016

(30) Foreign Application Priority Data

May 30, 2013 (JP) ................................. 2013-114208

(51) Int. Cl.
*F02D 19/08* (2006.01)
*F02D 41/30* (2006.01)
(Continued)

(52) U.S. Cl.
CPC ......... *F02D 19/081* (2013.01); *F02D 19/061* (2013.01); *F02D 19/0634* (2013.01);
(Continued)

(58) Field of Classification Search
CPC .............. F02D 19/081; F02D 41/3005; F02D 19/0639; F02D 19/084; F02D 19/088;
(Continued)

(56) References Cited

U.S. PATENT DOCUMENTS

2010/0024772 A1* 2/2010 Lewis ................. F02D 19/0605
123/446

FOREIGN PATENT DOCUMENTS

| JP | 2008-223493 A | 9/2008 |
| JP | 2009-002199 A | 1/2009 |

(Continued)

*Primary Examiner* — Hung Q Nguyen
*Assistant Examiner* — Xiao En Mo
(74) *Attorney, Agent, or Firm* — Hauptman Ham, LLP

(57) ABSTRACT

An internal combustion engine control device for a dual-injection internal combustion engine acquires first and second increase values, which are fuel increase ratios according to respective alcohol concentrations of a fuel injected by cylinder injection and a fuel injected by port injection. The control device determines a basic total injection amount of fuel that should be supplied to each cylinder in the case where the alcohol concentration of the fuel is zero. An amount of fuel injected from a cylinder injection valve is determined as if the alcohol concentration of the fuel were zero. A total injection amount is to correspond to an amount in accordance with the basic total injection amount and both, the first increase value and the second increase value, so that the increase in injected fuel amount is borne by port injection.

4 Claims, 6 Drawing Sheets

(51) Int. Cl.
*F02D 19/06* (2006.01)
*F02D 41/00* (2006.01)
*F02D 41/38* (2006.01)

(52) U.S. Cl.
CPC ..... *F02D 19/0639* (2013.01); *F02D 19/0692* (2013.01); *F02D 19/084* (2013.01); *F02D 19/087* (2013.01); *F02D 19/088* (2013.01); *F02D 41/0025* (2013.01); *F02D 41/3005* (2013.01); *F02D 41/3094* (2013.01); *F02D 2041/3881* (2013.01); *F02D 2200/0611* (2013.01); *F02D 2200/0612* (2013.01); *Y02T 10/36* (2013.01)

(58) Field of Classification Search
CPC .. F02D 19/087; F02D 19/061; F02D 41/0025; F02D 19/0692; F02D 19/0634; F02D 41/3094; F02D 2200/0612; F02D 2200/0611; F02D 2041/3881; Y02T 10/36
See application file for complete search history.

(56) References Cited

FOREIGN PATENT DOCUMENTS

| | | |
|---|---|---|
| JP | 2009-216005 A | 9/2009 |
| JP | 2010-024996 A | 2/2010 |

* cited by examiner

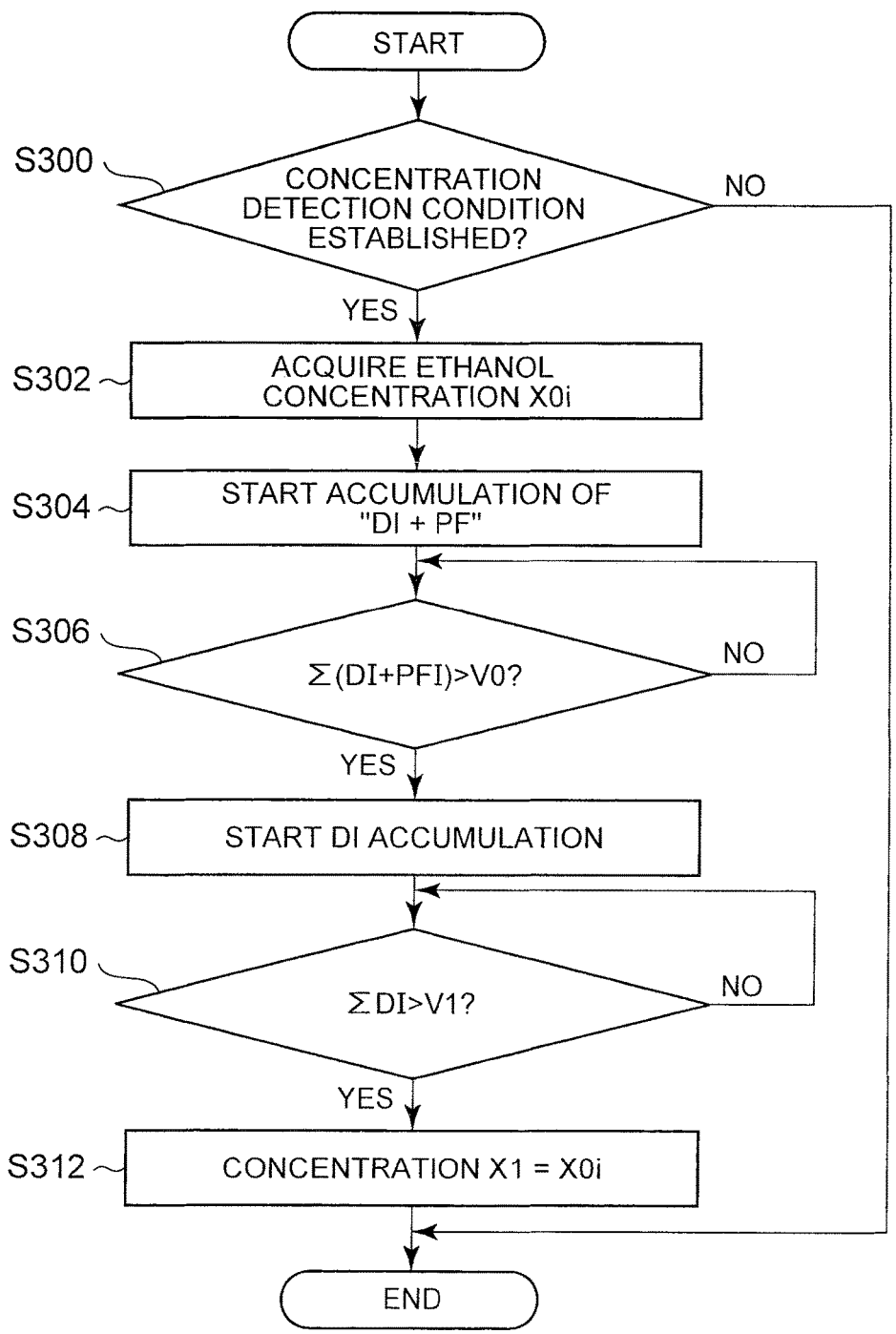

INTERNAL COMBUSTION ENGINE CONTROL DEVICE

CROSS-REFERENCE TO RELATED APPLICATIONS

This is a national phase application based on the PCT International Patent Application No. PCT/IB2014/000879 filed May 28, 2014, claiming priority to Japanese Patent Application No. 2013-114208 filed May 30, 2013, the entire contents of both of which are incorporated herein by reference.

BACKGROUND OF THE INVENTION

1. Field of the Invention

The present invention relates to a control device for an internal combustion engine which is able to use an alcohol mixed fuel in which alcohol is mixed with a hydrocarbon fuel and which is able to inject the alcohol mixed fuel from a port injection valve for injecting fuel to an induction port and from a cylinder injection valve for directly injecting fuel into a cylinder.

2. Description of Related Art

As an automotive internal combustion engine, there has been known an internal combustion engine for Flexible Fuel Vehicle (FFV) that is able to use a fuel in which alcohol such as ethanol is mixed with a hydrocarbon fuel such as gasoline. Further, there has been known a dual-injection internal combustion engine which includes a port injection valve for injecting fuel to an induction port and a cylinder injection valve for directly injecting fuel into a cylinder and which is able to change an injection ratio between these injection valves according to an operational state. Japanese Patent Application Publication No. 2009-216005 (JP 2009-216005 A) describes a technique related to a dual-injection internal combustion engine for FFV that has features of both of the above two types of internal combustion engines, that is, an internal combustion engine which includes a cylinder injection valve and a port injection valve and which is able to inject an alcohol mixed fuel from both of the injection valves.

In a conventional internal combustion engine for FFV, an engine control is performed by a method according to an alcohol concentration of a fuel. More specifically, as the alcohol concentration of the fuel is higher, a calorific value per unit volume becomes smaller. In view of this, a fuel injection amount is determined according to the alcohol concentration of the fuel. This is because if the fuel injection amount becomes excessive, emission increases, but if the fuel injection amount is insufficient, drivability becomes worse.

In the meantime, in a case of fuel injection by the cylinder injection valve, a fuel injection period during which stable burning is obtained is limited. Accordingly, in a case where the fuel injection amount from the cylinder injection valve is just increased according to the alcohol concentration of the fuel, the burning may become unstable.

Further, there are several types of commercially available alcohol mixed fuels of different alcohol concentrations. In view of this, when refueling is performed in a vehicle, there is such a possibility that a fuel having an alcohol concentration different from that of a currently used fuel is supplied to a fuel tank. In that case, an alcohol concentration in the fuel tank changes according to a fuel supply amount. However, a fuel that has been already drawn up from the fuel tank before the refueling, that is, a residual fuel in a fuel supply line keeps an alcohol concentration before the refueling. As a result, the fuel having the same alcohol concentration as the fuel before the refueling is injected from a fuel injection valve for a while after the refueling, and then, a fuel of which the alcohol concentration is changed by the refueling is injected from the fuel injection valve.

Here, the aforementioned dual-injection internal combustion engine includes a cylinder injection valve and a port injection valve for each cylinder. Further, the cylinder injection valve and the port injection valve are individually provided with respective fuel supply lines for distributing fuel to these fuel injection valves in each cylinder. According to such a configuration, while the fuel before the refueling is being replaced with the fuel after the refueling, fuels having different alcohol concentrations may be injected from the cylinder injection valve and the port injection valve in some cases.

For example, in the conventional internal combustion engine for FFV, on the premise that fuels having the same alcohol concentration are injected from the cylinder injection valve and the port injection valve, respective fuel injection amounts from these injection valves are determined according to respective blowing rates of the injection valves relative to a total amount of the fuels. In such a case, if there is a difference in the alcohol concentration between the fuel injected from the port injection valve and the fuel injected from the cylinder injection valve, the fuel injection amounts do not become amounts according to a desired air-fuel ratio, which conceivably causes a variation in the air-fuel ratio.

SUMMARY OF THE INVENTION

A first object of the present invention is to provide an internal combustion engine control device improved so as to be able to reduce a variation in an air-fuel ratio due to that variation in an alcohol concentration which occurs when an alcohol concentration of a fuel is changed. A second object of the present invention is to provide an internal combustion engine control device that achieves stabilization of a fuel by adequacy of a fuel injection period of a cylinder injection valve in a dual-injection internal combustion engine using cylinder injection and port injection.

An internal combustion engine control device according to one aspect of the present invention is applied to an internal combustion engine that uses a fuel in which alcohol is mixed with a hydrocarbon fuel, and includes: a cylinder injection valve provided in each of a plurality of cylinders and configured to directly inject a fuel into each of the cylinders; and a port injection valve configured to inject a fuel to an induction port of each of the cylinders. The internal combustion engine control device includes: a first acquisition portion configured to acquire a first increase value, which is a fuel increase ratio according to an alcohol concentration of the fuel injected from the cylinder injection valve, the fuel increase ratio being relative to a fuel injection amount of a case where the alcohol concentration of the fuel is zero; a second acquisition portion configured to acquire a second increase value, which is a fuel increase ratio according to an alcohol concentration of the fuel injected from the port injection valve, the fuel increase ratio being relative to the fuel injection amount of the case where the alcohol concentration of the fuel is zero; an acquisition portion configured to acquire a basic total injection amount, which is a total amount of the fuel required to be supplied to each of the cylinders in the case where the alcohol concentration of the fuel is zero; and a determination portion configured to determine a cylinder injection amount, which is a fuel amount injected from the cylinder injection valve, and a port injection amount, which is a fuel amount injected from the port injection valve, so that the cylinder injection amount becomes an injection amount required to be injected from the cylinder injection valve in the case where the alcohol concentration of the fuel is zero, and a total injection amount of the cylinder injection amount and the port injection amount becomes a total fuel amount, which is an amount obtained by increasing the basic total injection amount according to the first increase value and the second increase value.

In the internal combustion engine control device according to one aspect of the present invention, the determination portion may calculate that equivalent amount of the fuel injected from the cylinder injection valve, which is an amount corresponding to the fuel having an alcohol concentration of zero, according to the first increase value. The port injection amount is an amount calculated by increasing an amount obtained by subscribing the equivalent value from the basic total injection amount, according to the second increase value.

The internal combustion engine control device according to one aspect of the present invention may be applied to the internal combustion engine that further includes: a fuel supply line which is connected to a fuel tank and which supplies the fuel; a first line which is connected to the fuel supply line and which supplies the fuel to the cylinder injection valve; a second line which is connected to the fuel supply line and which supplies the fuel to the port injection valve; and a concentration sensor provided in the fuel supply line and detects an alcohol concentration of the fuel and outputs a value corresponding to the detected alcohol concentration of the fuel. The internal combustion engine control device may further include: a first estimation portion configured to estimate a concentration of the fuel injected from the cylinder injection valve, according to a volume of the fuel supply line on a downstream side from the concentration sensor and a volume of the first line, an accumulation value of the port injection amount and an accumulation value of the cylinder injection amount, and an output from the concentration sensor; and a second estimation portion configured to estimate a concentration of the fuel injected from the port injection valve according to the volume of the fuel supply line on the downstream side from the concentration sensor and a volume of the second line, the accumulation value of the cylinder injection amount and the accumulation value of the port injection amount, and the output from the concentration sensor. The first acquisition portion acquires the first increase value by use of that estimated value of the concentration of the fuel which is estimated by the first estimation portion, and the second acquisition portion acquires the second increase value by use of that estimated value of the concentration of the fuel which is estimated by the second estimation portion.

The internal combustion engine control device according to one aspect of the present invention may further include: a concentration detecting portion configured to detect an alcohol concentration of the fuel according to an output from the concentration sensor at a given first time point; a second-time-point detecting portion configured to detect a second time point at which a total of the accumulation value of the cylinder injection amount and the accumulation value of the port injection amount after the first time point reaches the volume of the fuel supply line on the downstream side from the concentration sensor; a third-time-point detecting portion configured to detect a third time point at which the accumulation value of the cylinder injection amount after the second time point reaches the volume of the first line; and a fourth-time-point detecting portion configured to detect a fourth time point at which the accumulation value of the port injection amount after the second time point reaches the volume of the second line. The first estimation portion sets an estimated value of a concentration of the fuel at the third time point to the alcohol concentration at the first time point, and the second estimation portion sets an estimated value of a concentration of the fuel at the fourth time point to the alcohol concentration at the first time point.

According to one aspect of the present invention, the cylinder injection amount and the port injection amount are determined so that the total amount of the cylinder injection amount and the port injection amount becomes a total fuel amount obtained by increasing the basic total fuel amount by the first, second increase values according to alcohol concentrations of respective fuels injected from the cylinder injection valve and the port injection valve. Hereby, even in a case where the fuels injected from the cylinder injection valve and the port injection valve have different alcohol concentrations, a fuel increased according to the alcohol concentrations of the respective fuels is supplied to each cylinder. Accordingly, it is possible to adjust the total fuel amount to be supplied into a cylinder to an amount according to an air-fuel ratio, thereby making it possible to restrain variation in the air-fuel ratio.

Further, the cylinder injection amount in one aspect of the present invention is set to a fuel injection amount to be injected from the cylinder injection valve in a case where the alcohol concentration of the fuel is zero, regardless of the concentration of the fuel to be injected. This makes it possible to obtain an injection timing at which a fuel is stable even in a case where the fuel concentration changes, thereby achieving reduction of emission and improvement of drivability. Further, it is not necessary to adapt the cylinder injection amount according to the concentration, thereby making it possible to achieve simplification of the control on the fuel injection amount.

Further, according to one aspect of the present invention, it is possible to adopt one common sensor as the concentration sensor used to estimate respective concentrations of the fuels injected from the cylinder injection valve and the port injection valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flow chart to describe a routine of a control executed by an ECU in Embodiment 2 of the present invention.

DETAILED DESCRIPTION OF EMBODIMENTS

Figure 1:
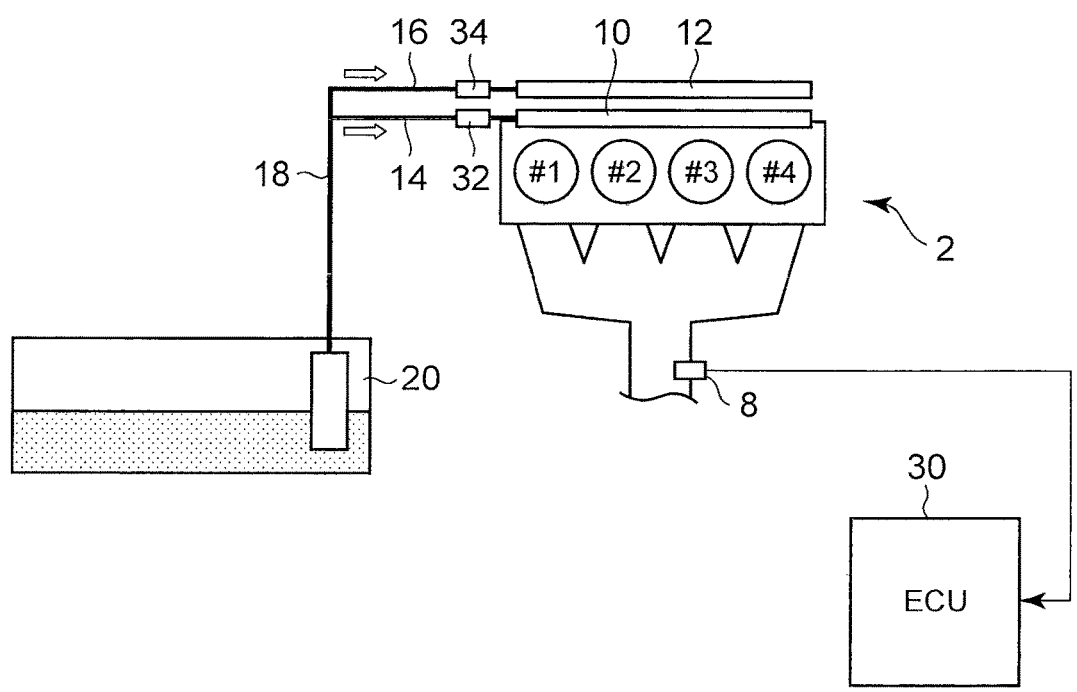
FIG. 1 is a view to describe a configuration of an internal combustion engine to which a control device according to Embodiment 1 of the present invention is applied.

Embodiments of the present invention will be described below with reference to drawings. The same or equivalent portions in the drawings have the same sign, and descriptions thereof are simplified or omitted.

Embodiment 1

[Overall Configuration of System in Embodiment 1]

FIG. 1 is a view to describe a configuration of an internal combustion engine to which a control device according to Embodiment 1 is applied. An internal combustion engine 2 according to the present embodiment is an internal combustion engine for FFV that is able to use a fuel in which alcohol (herein, ethanol) is mixed with a hydrocarbon fuel (herein, gasoline), and further, is a dual-injection internal combustion engine including a cylinder injection valve and a port injection valve for each cylinder.

The internal combustion engine 2 is provided with a cylinder injection valve delivery pipe 10 and a port injection valve delivery pipe 12. The cylinder injection valves of respective cylinders are connected to the cylinder injection valve delivery pipe 10. A first pipe 14 (a first line) is connected to one end of the cylinder injection valve delivery pipe 10. The port injection valves of the respective cylinders are connected to the port injection valve delivery pipe 12. A second pipe 16 (a second line) is connected to one end of the port injection valve delivery pipe 12.

Upstream ends of the first pipe 14 and the second pipe 16 are joined to one fuel pipe 18. A fuel pump for force-feeding a fuel from a fuel tank 20 is connected to the fuel pipe 18.

When these pipes are arranged as described above, part of the fuel force-fed from the fuel tank 20 by the fuel pump is supplied to the cylinder injection valve delivery pipe 10 via the fuel pipe 18 and the first pipe 14, so that the part of the fuel is injected into each cylinder from its cylinder injection valve. Further, part of the fuel force-fed from the fuel tank 20 by the fuel pump is supplied to the port injection valve delivery pipe 12 via the fuel pipe 18 and the second pipe 16, so that the part of the fuel is injected into an induction port of each cylinder from its port injection valve.

The first pipe 14 and the second pipe 16 are provided with concentration sensors 32, 34, respectively. Each of the concentration sensors 32, 34 is a sensor for providing an output according to an ethanol concentration of a fuel at its setting position.

An ECU 30 is a control device for controlling an operation of the internal combustion engine 2. The ECU 30 receives and processes signals from various sensors including an air-fuel-ratio sensor 8 and the concentration sensors 32, 34. Other than the air-fuel-ratio sensor 8 and the concentration sensors 32, 34, sensors are attached to various places of the internal combustion engine 2 and a vehicle. For example, a crank angle sensor (not shown) is attached in vicinity to a crankshaft, and an air flow meter (not shown) is attached to an inlet of an intake air passage. The ECU 30 processes the received signal of each of the sensors, and operates each actuator according to a predetermined control program. The actuators operated by the ECU 30 include a throttle valve, an ignition plug, and so on as well as the cylinder injection valves and the port injection valves. There are a lot of actuators and sensors connected to the ECU 30 except for those illustrated in the figure, but descriptions thereof are omitted in the present specification.

[Content of Control of Embodiment 1]

In Embodiment 1, that control on the internal combustion engine 2 which is executed by the ECU 30 as a control device includes a fuel injection control performed by operating the cylinder injection valve and the port injection valve. As described above, the fuel used for the internal combustion engine 2 in the present embodiment is an ethanol mixed gasoline in which ethanol is mixed with gasoline. In the ethanol mixed gasoline, an air-fuel ratio that achieves $\lambda=1$, namely, stoichiometry is different from that of the gasoline due to a difference in an H/C composition ratio in the fuel. In view of this, in a case where a feedback control is performed so that the air-fuel ratio achieves stoichiometry based on a signal from the air-fuel-ratio sensor, a large fuel injection amount is required in the ethanol mixed gasoline, as compared with 100% gasoline.

Figure 2:
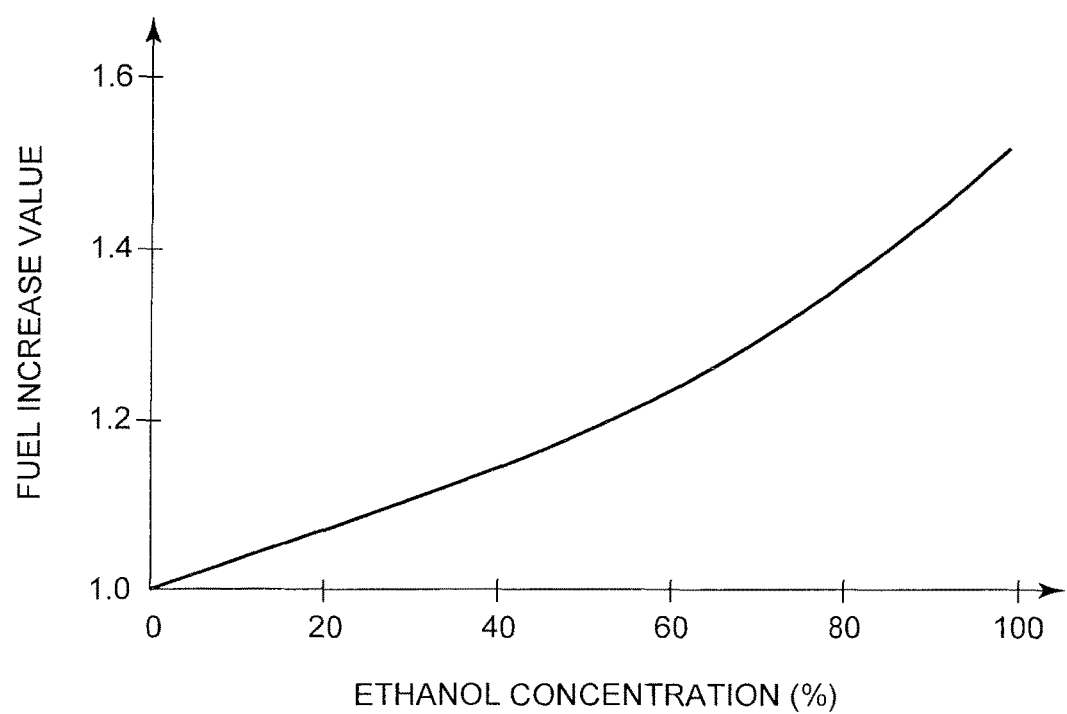
FIG. 2 is a view to describe a relationship between an ethanol concentration and a fuel increase value in Embodiment 1 of the present invention.

FIG. 2 is a view to describe a relationship between an ethanol concentration and a fuel increase value in Embodiment 1. In FIG. 2, a horizontal axis indicates an ethanol concentration, and a vertical axis indicates a fuel increase value. The fuel increase value indicates a fuel increase ratio relative to a fuel injection amount in case of 100% gasoline (that is, the ethanol concentration is zero). As illustrated in FIG. 2, in the ethanol mixed gasoline, as the ethanol concentration increases, the fuel increase value increases. That is, as the ethanol concentration in the fuel increases, the fuel increase value increases.

In the present embodiment, the ECU 30 stores therein a map that defines the relationship between the fuel increase value and the ethanol concentration relative to the fuel injection amount of 100% gasoline, as shown in FIG. 2, in advance. The ECU 30 sets an increased fuel injection amount according to the ethanol concentration by use of this map, as follows.

Figure 3:
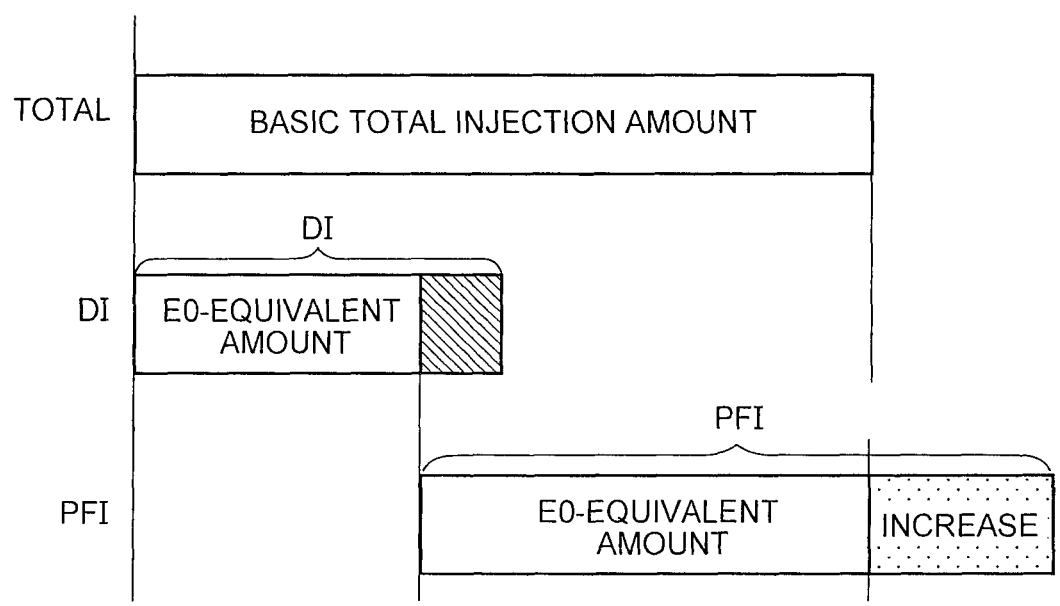
FIG. 3 is a view to describe calculation methods of a cylinder injection amount and a port injection amount in Embodiment 1 of the present invention.

FIG. 3 is a view to describe calculation methods of a cylinder injection amount DI, which is a fuel injection amount from the cylinder injection valve, and a port injection amount PFI, which is a fuel injection amount from the port injection valve, in Embodiment 1 of the present invention.

In FIG. 3, when the fuel is assumed 100% gasoline, a basic total injection amount Total is a total fuel mount obtained by adding up a cylinder injection amount and a port injection amount that should be injected to each cylinder in a cycle. The basic total injection amount Total is calculated according to an air intake amount in a course of a feedback control of air-fuel ratio.

In the present embodiment, regardless of the ethanol concentration, a cylinder injection period is set to a period during which injection from the cylinder injection valve should be performed in case of 100% gasoline, and a cylinder injection amount DI is a fuel amount according to the fuel injection period. That is, the cylinder injection period and its corresponding cylinder injection amount DI are set appropriately so that, regardless of the ethanol concentration of the fuel, fuel injection can be finished within a necessary period according to operation conditions of the internal combustion engine, such as a crank angle, a load factor of the internal combustion engine 2, and a water temperature.

That equivalent amount DI_E0 of the cylinder injection amount DI thus set which is equivalent to a 100%-gasoline fuel E0 is calculated by the following, formula (1):

$$DI\_E0 = DI/EGd \quad (1)$$

In the formula (1), EGd indicates a fuel increase value (a first increase value) according to an ethanol concentration of a fuel injected from the cylinder injection valve, relative to the 100%-gasoline fuel E0. This value is found from the map stored in the ECU 30 according to the ethanol concentration of the fuel injected from the cylinder injection valve. Further, in Embodiment 1, an ethanol concentration detected according to an output from the concentration sensor 32 is used as the ethanol concentration of the fuel injected from the cylinder injection valve.

Note that, in the following description, for simplification, an equivalent amount of a given fuel amount with respect to the 100%-gasoline fuel is referred to as "E0-equivalent amount." A port injection amount PFI is set so that a sum total of an E0-equivalent amount DI_E0 of the cylinder injection amount DI and an E0-equivalent amount PFI_E0 of the port injection amount PFI becomes the basic total injection amount Total. That is, the E0-equivalent amount PFI_E0 of the port injection amount PFI is represented by the following formula (2):

$$PFI\_E0 = Total - DI/EGd \quad (2)$$

An actual port injection amount PFI is a fuel amount obtained by increasing the E0-equivalent amount PFI_E0 of the port injection amount PFI according to the ethanol concentration. That is, the port injection amount PFI is calculated by use of a fuel increase value EGp (a second increase value) according to an ethanol concentration of a fuel injected from the port injection valve, according to the following formula (3):

$$PFI = (Total - DI/EGd) \times EGp \quad (3)$$

When the cylinder injection amount DI and the port injection amount PFI are set as described above, an injection amount obtained by adding up the cylinder injection amount DI and the port injection amount PFI is set to a total amount of the basic total injection amount Total and a fuel increase found by use of the fuel increase value EGd of cylinder injection and the fuel increase value EGp of port injection.

[Specific Control Routine of Embodiment 1]

Figure 4:
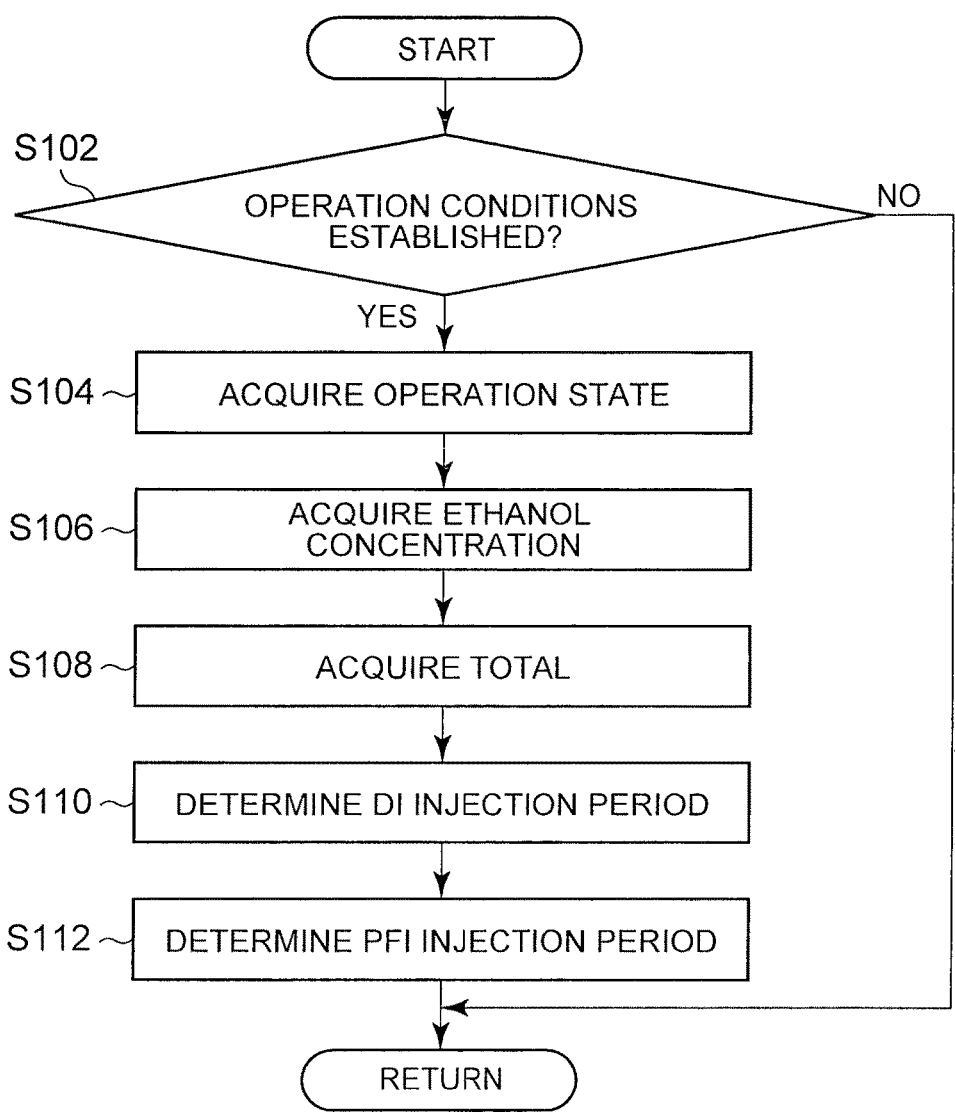
FIG. 4 is a flow chart to describe a routine of a control executed by an ECU in Embodiment 1 of the present invention.

FIG. 4 is a flow chart to describe a routine of a control executed by the ECU 30 in Embodiment 1 of the present invention. The routine of FIG. 4 is a routine repeatedly performed every fuel cycle during an operation of the internal combustion engine 2. In the routine of FIG. 4, initially, it is determined whether or not a current operation state satisfies predetermined operation conditions under which the port injection and the cylinder injection are used together (S102). Specific conditions are stored in advance in the ECU 30. In a case where the operating conditions under which the port injection and the cylinder injection are used together are not satisfied, this process is finished.

In the meantime, in a case where it is determined that the operation conditions are satisfied in step S102, information about the current operational state is acquired subsequently (S104). More specifically, information such as the number of engine rotations, and a load factor, a water temperature, and the like is acquired. Then, ethanol concentrations are acquired (S106). Here, outputs from the concentration sensors 32, 34 are acquired, and an ethanol concentration of a fuel of a cylinder injection valve side and an ethanol concentration of a fuel of a port injection valve side are detected separately based on those outputs.

Then, a basic total injection amount Total is acquired (S108). The basic total injection amount Total is a value calculated according to a current air intake amount in a course of a feedback control.

Then, a cylinder injection period and a cylinder injection amount DI are determined (S110). Here, the cylinder injection period is determined by a predetermined program according to the number of engine rotations, the fuel load factor, the water temperature, and the like, and its corresponding cylinder injection amount DI is calculated. Here, the cylinder injection amount DI is set to the same amount as an injection amount from the cylinder injection valve in case of the 100%-gasoline fuel. That is, the cylinder injection amount DI does not depend on the ethanol concentration of the fuel of the cylinder injection valve side.

Then, a port fuel injection period for a port injection amount PFI is determined (S112). The port injection amount PFI is calculated according to the above formula (3) by use of those respective fuel increase values EGd, EGp of the cylinder injection valve side and the port injection valve side which are calculated from the map according to the respective ethanol concentrations detected in step S106, the cylinder injection amount DI calculated in step S110, and the basic total injection amount Total calculated in step S108. Then, this process is finished.

[Effects of Embodiment 1]

As described above, in Embodiment 1, a total of the fuel injection amounts that are actually injected to each cylinder is calculated by use of the fuel increase value EGd according to the ethanol concentration of the fuel of the cylinder injection valve side and the fuel increase value EGp according to the ethanol concentration of the fuel of the port injection valve side. Accordingly, even in a case where the ethanol concentration of the fuel is different between the cylinder injection valve side and the port injection valve side, it is possible to supply an adequate amount of the fuel according to an air-fuel ratio to each cylinder on the basis of the difference in the ethanol concentration.

Further, in the present embodiment, regardless of the ethanol concentration of the fuel, the cylinder injection from the cylinder injection valve is set to the fuel injection period and the injection amount to be set in case of the 100%-gasoline fuel. Accordingly, regardless of changes in the ethanol concentration, it is possible to perform the cylinder injection in a period during which burning is stable, thereby achieving reduction of emission and improvement of drivability. Further, regarding the cylinder injection amount, it is not necessary to calculate an injection amount in consideration of the ethanol concentration. Accordingly, it is possible to reduce the number of steps of the control on the fuel injection amount and to achieve simplification of the control.

[Other Exemplary Configuration of Embodiment 1]

Note that the present embodiment deals with a case where a mixed fuel of gasoline and ethanol is used. However, the present invention is also applicable to cases where mixed fuels of other hydrocarbon-based fuels and alcohol fuels are used. The same applies to the other embodiments.

Further, the present embodiment describes that in a case where fuel injection is performed by using the cylinder injection valve and the port injection valve during an operation of the internal combustion engine 2, the cylinder injection amount DI and the port injection amount PFI are determined by the control of the present embodiment. However, the present invention is not limited to this, and only in a case where it is assumed that the ethanol concentration of the fuel injected from the cylinder injection valve is different from that of the port injection valve, for example, the determination of the fuel injection amount according to the present embodiment may be performed. More specifically, it is possible to perform the control of the injection amount according to the present embodiment, for example, only in a given period after refueling is newly performed but before the ethanol concentrations of the fuels injected from the respective injection valves are changed to an ethanol concentration after the refueling. The same applies to the other embodiments.

Further, the present embodiment deals with a case where the concentration sensors 32, 34 are provided in vicinity of the respective delivery pipes 10, 12, and the ethanol concentration of the fuel of the cylinder injection valve side and the ethanol concentration of the fuel of the port injection valve side are detected separately. However, the present invention is not limited to this configuration, and the concentration sensor 32 may be provided in other positions. Further, the present invention is not limited to the configuration including two concentration sensors, and may have other configurations provided that respective ethanol concentrations of the fuels injected from the respective injection valves or values associated with the concentrations are detectable or presumable. The same applies to the other embodiments.

Further, the present embodiment deals with the configuration in which upstream sides of the first pipe 14 and the second pipe 16 are joined to the common fuel pipe 18, and the fuel is supplied from the common fuel tank 20 thereto. However, the present invention is not limited to this, and may have such a configuration that the first pipe 14 and the second pipe 16 are directly connected to the common fuel tank 20, or the first pipe 14 and the second pipe 16 are connected to separate fuel tanks so that different fuels are supplied thereto. The same applies to the other embodiments.

The present embodiment deals with a case where, regardless of the ethanol concentration, the cylinder injection period is set to a period during which injection from the cylinder injection valve should be performed in case of 100% gasoline, and the cylinder injection amount DI is a fuel amount according to the fuel injection period. However, the determination method of the cylinder injection amount DI in the present invention is not limited to this. For example, as the cylinder injection amount, a fuel amount that should be injected in case of 100% gasoline may be calculated according to the operation conditions of the internal combustion engine, such as a crank angle, a load factor of the internal combustion engine 2, and a water temperature, and the cylinder injection period may be set according to the fuel amount (the cylinder injection amount) thus calculated.

In Embodiment 1, when the process of step S108 is performed, "an acquisition portion configured to acquire a basic total injection amount" in the present invention may be realized, and when the processes of steps S110 and S112 are performed, "a determination portion" may be realized.

Embodiment 2

A system of Embodiment 2 has the same configuration as the system in FIG. 1 except for a point that a first pipe 14 and a second pipe 16 do not include concentration sensors 32, 34, respectively, but a fuel pipe 18 includes one common concentration sensor 36. Further, the system of Embodiment 2 performs the same control as in Embodiment 1 except for a point that the one concentration sensor 36 estimates concentrations of fuels injected from a cylinder injection valve and a port injection valve.

Figure 5:
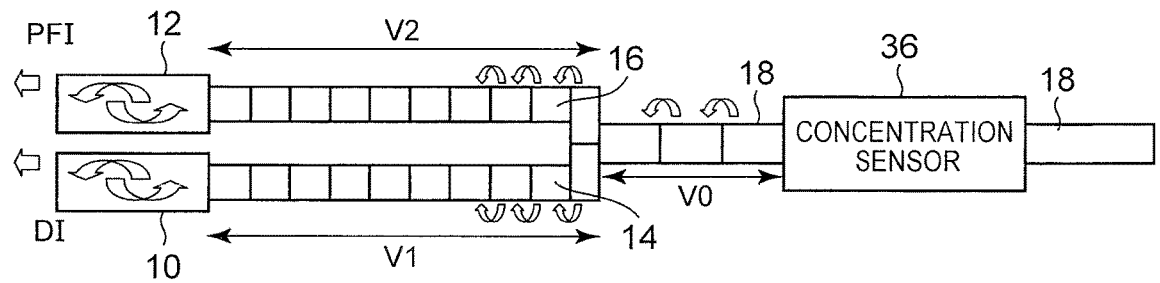
FIG. 5 is a view to describe an estimation method of an ethanol concentration of a fuel in Embodiment 2 of the present invention.

FIG. 5 is a view to describe an estimation method of an ethanol concentration of a fuel in Embodiment 2 of the present invention. FIG. 5 schematically illustrates the fuel pipe 18 on a downstream side of the concentration sensor 36, the first pipe 14 and a cylinder injection valve delivery pipe 10, and the second pipe 16 and a port injection valve delivery pipe 12.

[Calculation of Ethanol Concentration of Fuel Supplied to Delivery Pipe]

As illustrated in FIG. 5, in the present embodiment, a fuel concentration is estimated while fuel diffusions in the fuel pipe 18 and the first, second pipes 14, 16 are disregarded. That is, it is assumed that a fuel of which a concentration is measured in the concentration sensor 36 moves toward the downstream side in the fuel pipe 18 as much as a total fuel amount that has been injected, at every fuel injection. Further, on the downstream side from a branching point from the fuel pipe 18 to the first, second pipes 14, 16, it is considered that a fuel as much as an injected cylinder injection amount DI moves in the first pipe 14 toward the downstream side at every cylinder injection, and it is considered that a fuel as much as an injected port injection amount PFI moves in the second pipe 16 toward the downstream side at every port injection.

Here, n is assumed the number of injection times from a given first time point to a time point (a second time point) at which an accumulation value obtained by accumulating a total fuel amount at every fuel injection reaches a volume V0 of the fuel pipe 18, and m1 is assumed the number of times of cylinder injection from the (n+1)th time up to a time point (a third time point) at which an accumulation value of the cylinder injection amount DI reaches a volume V1 of the first pipe 14. A fuel of which an ethanol concentration is measured at the first time point moves in the fuel pipe 18 by n times of injection to enter the first pipe 14, and then moves in the first pipe 14 by m1 times of injection after the second time point to enter the cylinder injection valve delivery pipe 10.

That is, it is estimated that an ethanol concentration X1 of the fuel supplied to the cylinder injection valve delivery pipe 10 is close to an ethanol concentration X0 measured at the past first time point, by a total of the number of times of injection "n" and the number of times of injection "m1."

Similarly, m2 is assumed the number of times of port injection up to a time point (a fourth time point) at which an accumulation value of the port injection amount PFI after the (n+1)th time reaches a volume V2 of the second pipe 16. The fuel of which the ethanol concentration is measured at the given first time point moves in the fuel pipe 18 by n times of injection to enter the second pipe 16, and then moves in the second pipe 16 by m2 times of injection after that to enter the port injection valve delivery pipe 12. That is, it is estimated that an ethanol concentration X2 of the fuel supplied to the port injection valve delivery pipe 12 is close to the ethanol concentration X0 measured at the past first time point, by a total of the number of times of injection "n" and the number of times of injection "m2."

[Calculation of Ethanol Concentration of Injection Fuel]

In the meantime, in a case where fuels newly move into both delivery pipes 10, 12, variations in the concentrations before the fuels spread thereinside are disregarded, and it is considered that the fuels reaching both delivery pipes 10, 12 spread instantly in the delivery pipes 10, 12. Hereby, by use of the ethanol concentrations X1, X2 thus estimated, ethanol concentrations of respective fuels that are injected from the cylinder injection valve and the port injection valve are calculated as follows.

Initially, a first concentration, which is an ethanol concentration in the cylinder injection valve delivery pipe 10 at the time of a given fuel injection, is calculated according to the following formula (4):

$$\text{First concentration} = \text{previous cylinder injection concentration} \times (1-f1) + X1 \times f1 \quad (4)$$

Here, f1 is a ratio of that fuel moving amount of this time into the cylinder injection valve delivery pipe 10 which occupies a volume of the cylinder injection valve delivery pipe 10. Herein, a value obtained by dividing a fuel injection amount per unit time by the volume V1 of the cylinder injection valve delivery pipe 10 is used.

Similarly, a second concentration, which is an ethanol concentration in the port injection valve delivery pipe 12 at the time of a given fuel injection, is calculated according to the following formula (5):

$$\text{Second concentration} = \text{previous port injection concentration} \times (1-f2) + X2 \times f2 \quad (5)$$

Here, f2 is a ratio of that current fuel moving amount of this time into the port injection valve delivery pipe 12 which occupies a volume of the port injection valve delivery pipe 12. Herein, a value obtained by dividing a fuel injection amount per unit time by the volume of the port injection valve delivery pipe 12 is used.

[Specific Control Routine of Embodiment 2]

FIG. 6 is a flow chart to describe a routine of a control executed by an ECU 30 in Embodiment 2 of the present invention. The routine of FIG. 6 is a routine for calculating the ethanol concentration X1 of the fuel supplied to the cylinder injection valve delivery pipe 10. Further, the routine of FIG. 6 is started every predetermined time and a plurality of routines are performed concurrently.

In the routine of FIG. 6, it is determined whether or not a concentration detection condition is established or not (S300). The concentration detection condition is stored in the ECU 30 in advance. More specifically, the concentration detection condition includes a condition to determine whether or not it is necessary to estimate ethanol concentrations of the cylinder injection valve side and the port injection valve, for example: whether or not an internal combustion engine 2 is being operated; whether or not a current region is a region where fuel injection is performed from both of the cylinder injection valve and the port injection valve; and the like conditions. In a case where it is determined that the concentration detection condition is not established in step S300, this process is finished.

In step S300, in a case where it is determined that the concentration detection condition is established, an ethanol concentration X0$i$ at a present time i is detected (S302). Here, an output signal from the concentration sensor 36 is acquired, and the ethanol concentration X0$i$ according to this is detected.

Then, accumulations of the cylinder injection amount DI and the port injection amount PFI from the present time i are started (S304). An accumulation value is zero at a point before the accumulation is started. After the present time i, every time fuel injection is performed to each cylinder, a total fuel amount (DI+PFI) at the time of the fuel injection is added to the accumulation value.

Then, it is determined whether or not the accumulation value Σ(DI+PFI) of the cylinder injection amount DI and the port injection amount PFI reaches a volume V0 of a downstream side from the concentration sensor 36 in the fuel pipe 18 (S306). In a case where it is determined that the accumulation value Σ(DI+PFI) does not reach the volume V0, the process returns to step S306. That is, until the accumulation value Σ(DI+PFI) reaches the volume V0, the determination process of step S306 is repeated.

In step S306, in a case where it is determined that the accumulation value Σ(DI+PFI) reaches the volume V0, an accumulation of the cylinder injection amount DI is started at this time point (a second time point) (S308). An accumulation value ΣDI of the cylinder injection amount DI is zero at the time of an accumulation start (step S308), and every time cylinder injection is performed after the accumulation start, a cylinder injection amount DI at that time is added thereto.

Then, it is determined whether or not the accumulation value ΣDI reaches a volume V1 of a first supply line (S310). In step S310, in a case where it is determined that the accumulation value ΣDI does not reach the volume V1, the process returns to step S310, and the determination process of step S310 is repeated until the accumulation value ΣDI reaches the volume V1.

In the meantime, in step S310, in a case where it is determined that the accumulation value ΣDI reaches the volume V1, the ethanol concentration X1 of the fuel supplied to the cylinder injection valve delivery pipe 10 is updated to the concentration X0$i$ detected in step S302 (S312). Then, this process is finished.

In the present embodiment, similarly to the routine of FIG. 6, the ECU 30 stores therein a routine for updating an ethanol concentration X2 of the fuel supplied to the port injection valve delivery pipe, and this is performed repeatedly every predetermined time, similarly to FIG. 6.

More specifically, the routine for calculating the ethanol concentration X2 of the fuel supplied to the port injection valve delivery pipe 12 is performed such that: in step S306 in FIG. 6, in a case where it is determined that the accumulation value Σ(DI+PFI) of the cylinder injection amount DI and the port injection amount PFI reaches the volume V0, an accumulation of the port injection amount PFI is started, instead of the process of step S308.

Then, instead of the process of step S310, it is determined whether or not an accumulation value ΣPFI of the port injection amount PFI reaches a volume V2 of the second pipe 16. Then, in a case where it is determined that the accumulation value ΣPFI reaches the volume V2, instead of the process of step S312, the ethanol concentration X2 of the fuel supplied to the port injection valve delivery pipe 12 is updated to the concentration X0$i$ detected in step S302.

Further, every time the fuel injection is performed, the ECU 30 calculates the first concentration and the second concentration of fuels supplied subsequently according to the above formulae (4), (5) by use of the ethanol concentrations X1, X2 updated sequentially by the above routines.

As described above, according to Embodiment 2, even in case of the configuration in which the fuel supply line branches off to the respective injection valves, it is possible to estimate different ethanol concentrations of fuels on the cylinder injection side and the port injection side by use of one concentration sensor 36. The first and second concentrations thus calculated are usable for calculation and the like of the fuel increase values in Embodiment 1. This makes it possible to realize the invention of Embodiment 1 at lower cost.

Note that the present embodiment deals with a case where the control to estimate ethanol concentrations of fuels injected from respective injection valves is performed repeatedly during the operation of the internal combustion engine 2. However, the present invention is not limited to this, and the fuel concentrations may be detected only at a necessary predetermined timing. More specifically, in a case where a concentration sensor is provided in a fuel tank and refueling is performed, for example, a concentration of a fuel thus supplied may be detected as X0, so as to perform the routine of the concentration estimation as illustrated in FIG. 6 once every time the refueling is performed. Further, in this case, without employing such a configuration that the concentration sensor is provided in the fuel tank, when a period before a supplied fuel reaches a setting position of the concentration sensor has passed, the routine of the concentration estimation as illustrated in FIG. 6 may be performed.

What is claimed is:

1. An internal combustion engine control device for an internal combustion engine that uses a fuel in which alcohol is mixed with a hydrocarbon fuel, and that includes:
   a cylinder injection valve provided in each of a plurality of cylinders and configured to directly inject a fuel into each of the cylinders; and
   a port injection valve configured to inject a fuel to an intake port connected to each of the cylinders, the internal combustion engine control device comprising:
   a first acquisition portion programmed to acquire a first increase value, which is a fuel increase ratio in response to a detected alcohol concentration of the fuel injected from the cylinder injection valve, the fuel increase ratio being relative to a fuel injection amount of a case where the alcohol concentration of the fuel is zero;
   a second acquisition portion programmed to acquire a second increase value, which is a fuel increase ratio in response to a detected alcohol concentration of the fuel injected from the port injection valve, the fuel increase ratio being relative to the fuel injection amount of the case where the alcohol concentration of the fuel is zero;
   an acquisition portion programmed to acquire a basic total injection amount, which is a total amount of the fuel required to be supplied to each of the cylinders in the case where the alcohol concentration of the fuel is zero; and
   a determination portion programmed to determine a cylinder injection amount, which is a fuel amount injected from the cylinder injection valve, and a port injection amount, which is a fuel amount injected from the port injection valve, so that the cylinder injection amount becomes an injection amount required to be injected from the cylinder injection valve in the case where the alcohol concentration of the fuel is zero, and a total injection amount of the cylinder injection amount and the port injection amount becomes a total fuel amount, which is an amount obtained by increasing the basic total injection amount according to the first increase value and the second increase value, wherein the determination portion is programmed to calculate the port injection amount based on the following formula (1)

$$PFI=(Total-DI/EGd) \times EGp \quad (1)$$

where PFI is the port injection amount, Total is the total injection amount, DI is the cylinder injection amount, EGd is the first increase value, and EGp is the second increase value, wherein a value of EGd varies based on a first relationship with the detected alcohol concentration of the fuel injected from the cylinder injection valve, and a value of EGp varies based on a second relationship with the detected alcohol concentration of the fuel injected from the port injection valve.

2. The internal combustion engine control device according to claim 1, wherein:
   the determination portion calculates an equivalent amount of the fuel injected from the cylinder injection valve, which is an amount corresponding to the fuel having an alcohol concentration of zero, according to the first increase value, and calculates the port injection amount by increasing an amount obtained by subscribing the equivalent amount from the basic total injection amount according to the second increase value.

3. The internal combustion engine control device according to claim 1, wherein:
   the internal combustion engine further includes:
   a fuel pipe which is connected to a fuel tank and which supplies the fuel;
   a first pipe which is connected to the fuel pipe and which supplies the fuel to the cylinder injection valve;
   a second pipe which is connected to the fuel pipe and which supplies the fuel to the port injection valve; and
   a concentration sensor which is provided in the fuel pipe and which detects an output an alcohol concentration of the fuel;
   the internal combustion engine control device further comprises:
   a first estimation portion programmed to estimate a concentration of the fuel injected from the cylinder injection valve, according to a volume of the fuel pipe on a downstream side from the concentration sensor and a volume of the first pipe, an accumulation value of the port injection amount and an accumulation value of the cylinder injection amount, and an output from the concentration sensor; and
   a second estimation portion programmed to estimate a concentration of the fuel injected from the port injection valve according to the volume of the fuel pipe on the downstream side from the concentration sensor and a volume of the second pipe, the accumulation value of the cylinder injection amount and the accumulation value of the port injection amount, and the output from the concentration sensor;
   the first acquisition portion acquires the first increase value by use of an estimated value of the concentration of the fuel which is estimated by the first estimation portion; and
   the second acquisition portion acquires the second increase value by use of an estimated value of the concentration of the fuel which is estimated by the second estimation portion.

4. The internal combustion engine control device according to claim 3, further comprising:
   a concentration detecting portion configured to detect an alcohol concentration of the fuel according to an output from the concentration sensor at a given first time point;
   a second-time-point detecting portion configured to detect a second time point at which a total of the accumulation value of the cylinder injection amount and the accumulation value of the port injection amount after the first time point reaches the volume of the fuel pipe on the downstream side from the concentration sensor;

a third-time-point detecting portion configured to detect a third time point at which the accumulation value of the cylinder injection amount after the second time point reaches the volume of the first pipe; and a fourth-time-point detecting portion configured to detect a fourth time point at which the accumulation value of the port injection amount after the second time point reaches the volume of the second pipe, wherein:

the first estimation portion estimates a concentration of the fuel at the third time point according to the alcohol concentration at the first time point; and the second estimation portion estimates a concentration of the fuel at the fourth time point according to the alcohol concentration at the first time point.

* * * * *